UNITED STATES PATENT OFFICE.

WILLIAM N. GARTSIDE, OF RICHMOND, INDIANA.

COMPOSITION OF MATTER FOR LINING AND FACING MOLDS.

SPECIFICATION forming part of Letters Patent No. 315,402, dated April 7, 1885.

Application filed September 19, 1884. (No specimens.)

*To all whom it may concern:*

Be it known that I, WILLIAM N. GARTSIDE, a citizen of the United States of America, residing at Richmond, in the county of Wayne and State of Indiana, have invented a new and useful Composition of Matter for Lining or Facing Molds, of which the following is a specification.

My invention has relation to improvements in lining or facing for molds, and the object is to provide a lining or facing for the purpose named which is indestructible by contact with the molten contents of the mold, and which posesses sufficient porosity to admit of the escape of the gases generated by or accompanying the operations of depositing the molten metal in the molds.

My invention consists of a composition for lining or facing molds made of a mixture of pulverized asbestus and mica in about equal proportions.

My invention further consists of a composition of matter for lining or facing molds made of the mixture of pulverized asbestus, pulverized mica, and starch-dust, as hereinafter stated.

My invention further consists in a composition of matter for lining or facing molds made of a mixture of pulverized asbestus, pulverized mica, and sand, as hereinafter stated.

My invention further consists of a composition of matter for lining or facing molds made of a mixture of pulverized asbestus, pulverized mica, starch-dust, and sand, as hereinafter set forth.

As a core-wash and lining for molds, asbestus alone is found to be so close and compact in body that the gases accompanying or generated in the process of molding cannot escape. Asbestus packs like flour and becomes impervious to gas. Therefore its admixture with a material to obtain greater porosity is desirable and essential. I have selected pulverized mica as such ingredient, and find that when mixed with pulverized asbestus the result is a composition presenting the desirable qualities of weight, porosity, and non-combustibility, and which prevents the formation of scale on the face of the casting.

In practice the use and preparation of the mixture is varied according to the work to be made in the molds—that is, whether the molds are for heavy or light castings—and also will be affected by the grade of the sand, whether it be fine or coarse. Fine sand requires an open or porous facing, and coarse sand makes a finer cast with a close facing. Therefore in making heavy castings, in order to lessen the expense, I mix about equal quantity of facing-sand with the asbestus and mica, and apply the composition as usual, either dry or tempered, the same as prepared molding-sand. When the mold is of fine sand, the facing should have the proportion of the amount of mica increased, so that the proportion shall be, say, one-third asbestus and two-thirds mica.

When the composition is used as a core-wash, I add a quantity of starch or similar material—say five pounds to the hundred of the mica and asbestus—and use it dry on the core, or mix it with water and apply it with a brush. The starch holds the facing together and on the core, and, when the mold is filled, carbonizes, and the desired porosity is thus attained and maintained.

In ordinary moldings I use the facing as follows: I lay the pattern on the bottom board, then place the flask over the pattern, and riddle the facing on the pattern until I get it covered, say, with a coating of facing from one-fourth to one-half inch thick. I then fill the balance of the flask with the molding-sand and ram it. I then turn the flask and draw the pattern, leaving the face of the mold composed of the facing. Another way to use the facing is applicable to "returning the pattern." The mold is made in the ordinary way, and the pattern withdrawn. Then the facing is dusted on the mold through a canvas bag, and the pattern returned.

The facing may also be used to strengthen the sand by mixing a little of it in the sand-heap. It gives the sand life and makes it stick together better.

What I claim as my invention, and desire to secure by Letters Patent, is—

1. A composition for facing or lining molds or cores, composed of pulverized mica and pulverized asbestus in about the proportions specified, and substantially as set forth.

2. A composition for facing or lining molds for cores, composed of pulverized mica, pulverized asbestus, and sand in about the proportions specified, and substantially as set forth.

3. A composition for facing or lining molds or cores, composed of pulverized mica, pulverized asbestus, and starch-dust in about the proportions specified, and substantially as set forth.

4. A composition for facing or lining molds or cores, composed of pulverized mica, pulverized asbestus, sand, and starch-dust in about the proportions specified, and substantially as set forth.

In witness whereof I have hereunto set my hand in the presence of two attesting witnesses.

WILLIAM N. GARTSIDE.

Attest:
ALVIN E. CROCKER,
GEERING STACE.